(12) United States Patent
Kinoshita et al.

(10) Patent No.: US 7,753,378 B2
(45) Date of Patent: Jul. 13, 2010

(54) CYLINDER HEAD GASKET

(75) Inventors: Yuuichi Kinoshita, Tokyo (JP); Kishou Yasuda, Tokyo (JP); Suguru Onuki, Tokyo (JP); Kazuya Yoshijima, Okazaki (JP)

(73) Assignees: Ishikawa Gasket Co., Ltd., Tokyo (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 11/798,361

(22) Filed: May 14, 2007

(65) Prior Publication Data
US 2007/0267823 A1    Nov. 22, 2007

(30) Foreign Application Priority Data
May 16, 2006  (JP)  ............................... 2006-136162
Oct. 31, 2006  (JP)  ............................... 2006-296644

(51) Int. Cl.
*F02F 11/00*   (2006.01)
(52) U.S. Cl. .................. 277/594; 277/593; 277/595; 277/600
(58) Field of Classification Search ......... 277/593–595, 277/600, 601
See application file for complete search history.

(56) References Cited

U.S. PATENT DOCUMENTS

| | | | | |
|---|---|---|---|---|
| 4,468,044 A * | 8/1984 | Ulmer et al. | ................. | 277/596 |
| 4,739,999 A | 4/1988 | Ishii et al. | | |
| 4,799,695 A * | 1/1989 | Yoshino | ...................... | 277/592 |
| 4,807,892 A * | 2/1989 | Udagawa | ..................... | 277/595 |
| 4,836,562 A * | 6/1989 | Yoshino | ...................... | 277/595 |
| 4,938,488 A * | 7/1990 | Udagawa et al. | ............. | 277/595 |
| 4,976,445 A * | 12/1990 | Udagawa | ..................... | 277/595 |
| 4,995,624 A * | 2/1991 | Udagawa et al. | ............. | 277/595 |
| 5,009,438 A | 4/1991 | Udagawa | | |
| 5,131,668 A * | 7/1992 | Uchida | ........................ | 277/595 |
| 5,255,926 A * | 10/1993 | Udagawa | ..................... | 277/595 |
| 5,277,433 A * | 1/1994 | Ishikawa et al. | ............. | 277/593 |
| 5,286,039 A * | 2/1994 | Kawaguchi et al. | ......... | 277/593 |
| 5,306,023 A * | 4/1994 | Udagawa | ..................... | 277/601 |
| 5,395,127 A * | 3/1995 | Miyaoh | ....................... | 277/595 |
| 5,395,128 A * | 3/1995 | Udagawa | ..................... | 277/595 |
| 5,435,575 A * | 7/1995 | Udagawa | ..................... | 277/592 |
| 5,460,387 A * | 10/1995 | Miyaoh et al. | .............. | 277/601 |
| 5,490,681 A * | 2/1996 | Plunkett et al. | ............. | 277/592 |
| 5,511,796 A * | 4/1996 | Udagawa | ..................... | 277/593 |
| 5,522,604 A * | 6/1996 | Weiss et al. | .................. | 277/594 |
| 5,560,623 A * | 10/1996 | Yoshino | ...................... | 277/595 |
| 5,605,342 A * | 2/1997 | Genin et al. | ................. | 277/600 |

(Continued)

FOREIGN PATENT DOCUMENTS

DE    43 05 974 C1    5/1994

(Continued)

*Primary Examiner*—Alison K Pickard
(74) *Attorney, Agent, or Firm*—Manabu Kanesaka

(57) ABSTRACT

A cylinder head gasket for an internal combustion engine with a cylinder bore and a fluid hole includes a first metal plate having a curved portion around the cylinder bore and a folded portion extending from the curved portion, and a second metal plate laminated on the first metal plate and having a first full bead projecting toward the first metal plate. The first full bead is disposed on the folded portion. At least one secondary plate is inserted inside the folded portion.

3 Claims, 2 Drawing Sheets

U.S. PATENT DOCUMENTS

| | | | |
|---|---|---|---|
| 5,609,345 A | 3/1997 | Miura et al. | |
| 5,618,049 A * | 4/1997 | Ueta | 277/595 |
| 5,873,577 A * | 2/1999 | Inamura | 277/594 |
| 5,899,462 A * | 5/1999 | Udagawa | 277/593 |
| 5,927,724 A * | 7/1999 | Maschmann et al. | 277/593 |
| 5,957,463 A * | 9/1999 | Inamura | 277/593 |
| 6,089,572 A * | 7/2000 | Plunkett | 277/592 |
| 6,105,971 A * | 8/2000 | Hasegawa | 277/593 |
| 6,206,381 B1 * | 3/2001 | Ii et al. | 277/593 |
| 6,220,606 B1 * | 4/2001 | Kawaguchi et al. | 277/595 |
| 6,250,644 B1 * | 6/2001 | Diez et al. | 277/595 |
| 6,299,175 B1 * | 10/2001 | Maekawa et al. | 277/593 |
| 6,315,303 B1 * | 11/2001 | Erb et al. | 277/593 |
| 6,336,639 B1 * | 1/2002 | Ishida et al. | 277/594 |
| 6,347,801 B1 * | 2/2002 | Nakamura | 277/598 |
| 6,457,724 B2 * | 10/2002 | Ogaeri et al. | 277/595 |
| 6,478,302 B1 * | 11/2002 | Nakamura | 277/317 |
| 6,478,307 B2 * | 11/2002 | Sugimoto et al. | 277/592 |
| 6,851,677 B2 * | 2/2005 | Miyaoh et al. | 277/594 |
| 6,957,815 B1 * | 10/2005 | Inciong | 277/593 |
| 6,962,345 B2 * | 11/2005 | Inciong et al. | 277/593 |
| 7,108,268 B2 * | 9/2006 | Udagawa | 277/593 |
| 7,290,770 B2 * | 11/2007 | Kasuya | 277/592 |
| 2002/0170520 A1 * | 11/2002 | Miyaoh | 123/193.5 |
| 2003/0085530 A1 * | 5/2003 | Miyaoh et al. | 277/593 |
| 2005/0179210 A1 | 8/2005 | Sueda | |
| 2006/0163820 A1 * | 7/2006 | Udagawa et al. | 277/593 |
| 2007/0069482 A1 * | 3/2007 | Yasuda | 277/593 |

FOREIGN PATENT DOCUMENTS

| | | |
|---|---|---|
| DE | 298 12 037 U1 | 9/1998 |
| EP | 0 697 550 A1 | 2/1996 |
| JP | H01-179154 U | 12/1989 |
| JP | H04-44456 U | 4/1992 |
| JP | H04-129967 | 11/1992 |
| JP | H08-121597 | 5/1996 |
| JP | H08-291863 A | 11/1996 |
| JP | H09-105463 A | 4/1997 |
| JP | H10-213227 | 8/1998 |
| JP | H11-294589 A | 10/1999 |
| JP | 2004-278711 A | 10/2004 |

* cited by examiner

US 7,753,378 B2

CYLINDER HEAD GASKET

BACKGROUND OF THE INVENTION AND RELATED ART STATEMENT

The present invention relates to a cylinder head gasket placed between two members, such as a cylinder head and a cylinder block of an engine to seal therebetween. More specifically, even when the members on both sides are rubbed against each other and misaligned due to an external factor, such as a heat deformation of the members, the surface pressure on the end portion of a bore can be controlled not to rise, and indentation generated at the members can be reduced.

The cylinder head gasket is tightened by head bolts and seals fluid, such as combustion gas, oil, and coolant water in a state of being placed between the cylinder head and the cylinder block (cylinder body) of an automobile engine.

Also, as the weight and size of an engine have been reduced recently, the engine tends to have lower rigidity. Accordingly, when a large seal surface pressure is provided on the nearest part of the cylinder bore in order to assure a seal quality during the sealing of the cylinder head gasket, the cylinder bore is deformed because the engine member has lower rigidity. When the cylinder bore is deformed, a seal method, such as a bead or a folded portion, does not function well, and an adequate seal quality can not be obtained.

In order to provide an excellent seal quality by reducing the number of laminated plates, usage of the material, and the thickness of a whole gasket, and also by increasing the tightening pressure of the rim of a cylinder to the highest, metal gaskets, such as those shown in Japanese Patent Publications No. 8-121597 and No. 10-213227, form a wide folded portion (grommet portion) by directly folding back a secondary plate at the rim of the cylinder, and provide a full bead in two sheets of main plates which clamp the secondary plate. The full bead has a projection on the secondary plate side, and comes together with the folded portion.

However, in this kind of cylinder head gasket, the rim of the cylinder has the highest tightening pressure (seal pressure), so that the deformation of the cylinder bore can be accelerated. Also, the folded portion is directly folded back, and the folded diameter of the folded portion is small, thereby easily creating a crack.

In view of the problems described above, an object of the present invention is to provide a cylinder head gasket which can provide an excellent seal quality around the cylinder bore, and also can reduce the indentation around the cylinder bore which is generated at the engine member.

Further objects and advantages of the invention will be apparent from the following description of the invention.

SUMMARY OF THE INVENTION

In order to attain the objects described above, according to the present invention, a cylinder head gasket comprises a first metal plate with a folded portion around a cylinder bore; and a second metal plate which is laminated on the first metal plate and forms a full bead projecting to a first metal plate side. The projected portion of the full bead is disposed on the inner perimeter side of the end portion of the folded portion, and at least one or more sheets of secondary plate is inserted and disposed inside the folded portion.

According to the structure, by inserting and disposing the secondary plate inside the folded portion, the thickness of the folded portion can be made thicker, so that the curvature of the folded portion increases, hereby preventing the development of a crack.

In the cylinder head gasket, the second metal plate is laminated on the folded portion side of the first metal plate. In this structure, although the laminated position of the second metal plate comes to the side with the folded portion from the side without the folded portion, the above-mentioned same effect can be obtained.

In the cylinder head gasket, the thickness around the cylinder bore of the second metal plate is made smaller than half of the thickness of the folded portion. With this structure, even when a large tightening force is generated around the cylinder bore, the end portion of the second metal plate is entered into the rounded portion of the folded portion around the periphery of the cylinder bore, so that an excessive seal pressure is not added in the periphery of the cylinder bore, hereby controlling the deformation of the cylinder bore.

In the cylinder head gasket, a first secondary plate which is flat on the inner perimeter side of the end portion of the folded portion; and a ring-shape second secondary plate with a bead on the inner perimeter side of the end portion of the folded portion, are inserted and disposed inside the folded portion. Accordingly, the thickness of the folded portion can be adjusted by the first and second secondary plates. In addition, the compressibility of the folded portion can be increased by the bead of the second secondary plate, hereby preventing creep relaxation of the folded portion.

Also, if the projected portion of the second metal plate and the projected portion (contact portion with the first metal plate) of the bead of the second secondary plate are located in the same position in a plan view, a larger seal pressure can be formed. Also, if the above-mentioned two projected portions are misaligned in the plan view, the area of a relatively large seal pressure can be broadened while the maximum seal pressure is reduced.

Further, a third metal plate may be laminated on the first metal plate at a side opposite to the second metal plate. The third metal plate includes a full bead projecting toward the first metal plate. The full bead is disposed on the folded portion.

According to the cylinder head gasket, an excellent seal quality around the cylinder bore can be obtained, and by controlling the seal pressure around the periphery of each cylinder bore to be small, the deformation of the cylinder bore of the engine can be controlled.

Especially, even when the upper surface side and the lower surface side of the cylinder head gasket are rubbed against each other and misaligned due to an external factor, such as a heat deformation of a cylinder head or a cylinder block, the rise of the surface pressure on the tip of the bore can be controlled, thereby reducing indentation generated in the cylinder head or the cylinder block.

DETAILED DESCRIPTION OF PREFERRED EMBODIMENTS

Hereunder, a cylinder head gasket according to embodiments of the present invention will be described in detail with reference to the attached drawings. Incidentally, FIGS. 1-6 are schematic explanatory views, in which the thicknesses of plates, and sizes of the cylinder bores, the folded portions, and beads are different from actual ones, so that the cylinder head gaskets are enlarged for the sake of explanation.

The cylinder head gasket according to the invention is a metal gasket placed between engine members, such as a cylinder head and a cylinder block (cylinder body) of an engine to seal fluid, such as high-temperature and pressure combustion gas in the cylinder bore, and coolant water or oil in passages for the coolant water or cooling oil.

The cylinder head gasket is formed of single or multiple sheets of metal plates (metal substrates) made of soft steel, annealed stainless (annealed material), or stainless material (spring steel). Also, the cylinder head gasket is produced in a shape corresponding to the shape of the engine member, such as the cylinder block, and is provided with cylinder bores (combustion chamber holes), fluid holes for circulating the coolant water or engine oil, or bolt holes for tightening head bolts.

Figure 1:
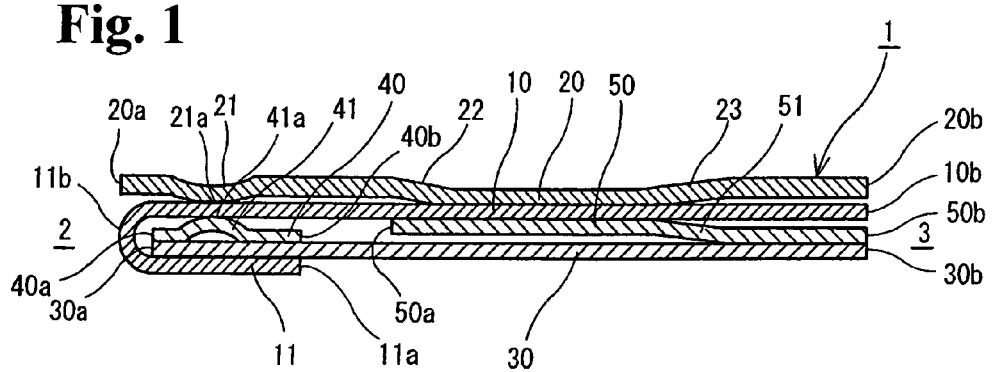
FIG. 1 is a fragmentary sectional view of a cylinder head gasket according to a first embodiment of the present invention.
Figure 2:
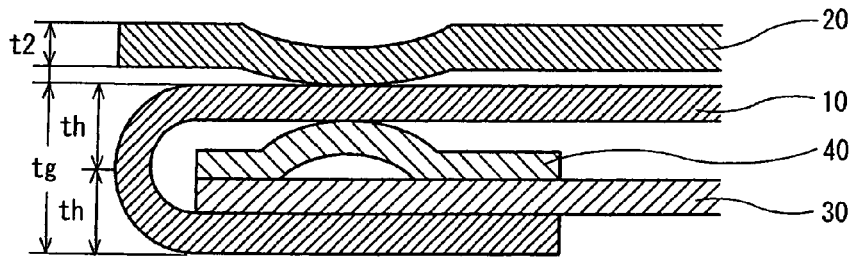
FIG. 2 is an enlarged fragmentary sectional view of the proximity of a folded portion in FIG. 1.

Firstly, the first embodiment of the invention will be explained. As shown in FIGS. 1 and 2, the cylinder head gasket 1 of the first embodiment is comprised of two sheets of metal plates 10, 20, and three sheets of secondary plates 30, 40, 50. The first metal plate 10 is made of annealed stainless, and the second metal plate 20 is made of stainless spring steel. Also, the first secondary plate 30 is made of soft steel or annealed stainless, and the second secondary plate 40 with a full bead 41 is made of stainless material. The third secondary plate 50 with the half bead 51 is made of annealed stainless.

The first metal plate 10 includes a folded portion or flange 11 which is made by folding back the first metal plate 10 around the cylinder bore 2. The second metal plate 20 is laminated on the first metal plate 10 on the side where the first metal plate 10 does not include the folded portion 11; however, the second metal plate 20 is provided with a full bead 21 which has a projection on the first metal plate 10 side (inside), and a projected portion 21a of the full bead 21 is disposed on the inner perimeter side of the end portion 11a of the folded portion 11.

Also, the first secondary plate 30 and the second secondary plate 40 are inserted and disposed inside the folded portion 11. The first secondary plate 30 is formed flat on the inner perimeter side of the end portion 11a of the folded portion 11. The second secondary plate 40 is formed in a ring-shaped plate with the full bead 41 on the inner perimeter side of the end portion 11a of the folded portion 11. In a plan view, an end portion 40a on the inner perimeter side of the second secondary plate 40 is located in the same position with an end portion 30a on the inner perimeter side of the first secondary plate 30. An end portion 40b on the outer perimeter side of the second secondary plate 40 is located in the same position as the end portion 11a of the folded portion 11. The thickness tg of the folded portion 11 can be made thicker by inserting and disposing the secondary plates 30, 40, so that the curvature of the rounded portion 11b of the folded portion 11 increases, thereby preventing the development of a crack.

In addition, the compressibility of the folded portion 11 can be increased by the full bead 41 of the second secondary plate 40, thereby preventing creep relaxation of the folded portion 11. Usually, a full bead is used for the bead 41 of the second secondary plate 40; however, a half bead may be used, and any bead can be used as long as the bead can prevent creep relaxation of the folded portion 11. Also, a number of beads may be combined.

As shown in FIG. 2, the plate thickness t2 around the cylinder bore 2 of the second metal plate 20 is made smaller than the half th of the thickness tg of the folded portion 11, i.e. t2<th (=tg/2). Also, the thickness tg of the folded portion 11 becomes thicker by inserting and disposing the secondary plates 30, 40 into the folded portion 11, so that the plate thickness t2 around the cylinder bore 2 of the second metal plate 20 can be easily made smaller than the half th of the thickness tg of the folded portion 11, respectively.

In addition, around the periphery of the water hole 3, the second metal plate 20 includes half beads 22, 23. The direction of the projection of the half bead 23 is the same as that of the projected portion 41a of the full bead 41 of the second secondary plate 40. Also, the third secondary plate 50 forms the half bead 51 which projects to the opposite direction relative to the half bead 23. These two half beads 23, 51 are disposed in the same position in the plan view. More specifically, each sloping portion of the half beads 23, 51 is disposed in such a way as to overlap each other in the plan view. Also, an end portion 50a of the third secondary plate 50 which is located on the side of the perimeter of the cylinder bore 2 is positioned on the outer perimeter side compared to the end portion 11a of the folded portion 11.

Therefore, the rounded portion 11b of the folded portion 11 of the first metal plate 10, and the end portion 20a of the second metal plate 20, are aligned around the cylinder bore 2. The end portions 10b, 20b of the first and second metal plates 10, 20, and the end portions 30b, 50b of the first and third secondary plates 30, 50, are aligned around the periphery of the water hole 3.

According to the cylinder head gasket 1 with the above-mentioned structure, even when a large tightening force is generated around the cylinder bore 2 due to the relationship of thicknesses, the end portion 20a of the second metal plate 20 is entered into the rounded portion 11b side of the folded portion 11 around the periphery of the cylinder bore 2. Accordingly, a large surface pressure is not generated around the periphery of the cylinder bore 2, and the maximum surface pressure is generated on the outer perimeter side. As a result, an excessive seal pressure is not added in the periphery of the cylinder bore of the engine, thereby controlling the deformation of the cylinder bore. More specifically, by minimizing the maximum value of the surface pressure of the periphery of each cylinder bore 2, the deformation of each cylinder bore can be prevented. Incidentally, the width of the folded portion 11 or shapes or sizes of the beads 21, 41 can be obtained by a distribution of the surface pressure which is obtained by an experiment or calculation.

Also, when a large tightening force is not added, an appropriate seal pressure is added even in the periphery of the cylinder bore by the folded portion 11 and the full bead 21, and moreover, seal pressure is added by a seal line which is formed by the full bead 2 on the outer perimeter side, thereby exerting an excellent seal quality.

With the first and second secondary plates 30, 40, the thickness tg of the folded portion 11 can be adjusted, and additionally, the compressibility of the folded portion 11 can be increased by the full bead 41 of the second secondary plate 40, thereby preventing creep relaxation of the folded portion 11. Usually, a full bead is used for the bead 41 of the second secondary plate 40; however, a half bead may be used, and any bead may be used as long as the bead can prevent creep relaxation of the folded portion 11. Also, a number of beads may be combined.

Also, if the projected portion 21a of the full bead 21 of the second metal plate 20, and the projected portion (contact portion with the first metal plate) 41a of the full bead 41 of the second secondary plate 40 are located in the same position in a plan view, a larger seal pressure can be generated. Also, if the above-mentioned two projected portions 21a, 41a are misaligned in the plan view, the area of a relatively large seal pressure can be broadened while the maximum seal pressure is reduced.

With this structure, even when the upper surface side and the lower surface side of the cylinder head gasket 1 are rubbed against each other and misaligned due to an external factor such as a heat deformation of a cylinder head or a cylinder block, the rise of the surface pressure on the end portion of the bore can be controlled, thereby reducing the indentation generated at the cylinder head or the cylinder block.

In the above, the full beads 21, 41 are explained with the circular bead in the cross-sectional shape. However, the shape of the bead is not specially limited in this invention, and the cross-sectional shape may be a circular arc, sine (cosine), trapezoid, triangle (mountain shape), and the like.

Figure 3:
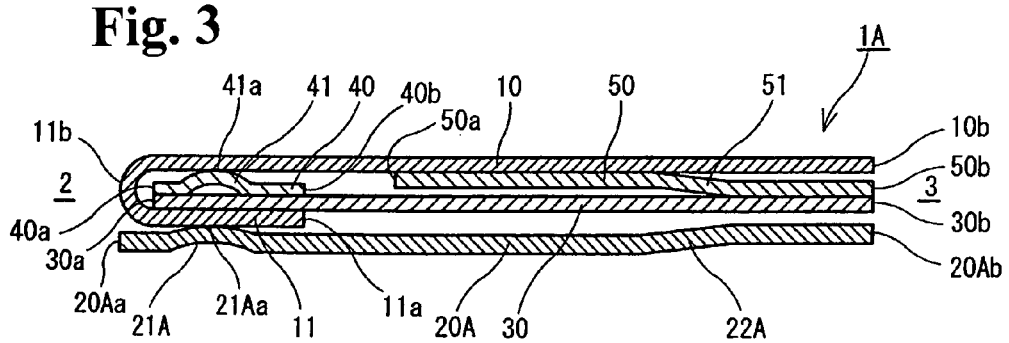
FIG. 3 is a fragmentary sectional view of the cylinder head gasket according to a second embodiment of the present invention.
Figure 4:
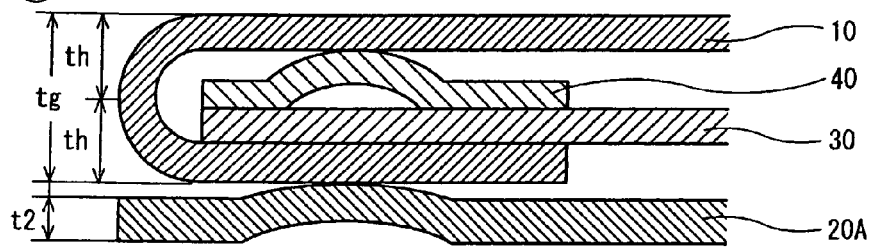
FIG. 4 is an enlarged fragmentary sectional view of the proximity of the folded portion in FIG. 3.

Next, the second embodiment of the invention will be explained. As shown in FIGS. 3 and 4, a cylinder head gasket 1A of the second embodiment is comprised of two sheets of metal plates 10, 20A and three sheets of secondary plates 30, 40, 50. The first metal plate 10 is made of annealed stainless, and the second metal plate 20A is made of stainless spring steel. Also, the first secondary plate 30 is made of soft steel or annealed stainless, and the second secondary plate 40 including the full bead 41 is made of stainless material. In addition, the third secondary plate 50 including the half bead 51 is made of annealed stainless.

The first metal plate 10 includes the folded portion 11 which is made by folding back the first metal plate 10 around the cylinder bore 2. The second metal plate 20A is laminated in the folded portion 11 on the folded portion 11 side of the first metal plate 10. However, a full bead 21A which is projected to the first metal plate 10 side (inside) is provided in the second metal plate 20A, and a projected portion 21Aa of the full bead 21A is located on the inner perimeter side of the end portion 11a of the folded portion 11.

Also, the first secondary plate 30 and the second secondary plate 40 are inserted and disposed inside the folded portion 11. The first secondary plate 30 is formed flat on the inner perimeter side of the end portion 11a of the folded portion 11. The second secondary plate 40 is formed in a ring-shaped plate with the full bead 41 on the inner perimeter side of the end portion 11a of the folded portion 11. In a plan view, the end portion 40a on the inner perimeter side of the second secondary plate 40 is located in the same position with the end portion 30a on the inner perimeter side of the first secondary plate 30. The end portion 40b on the outer perimeter side of the second secondary plate 40 is located in the same position with the end portion 11a of the folded portion 11. The thickness tg of the folded portion 11 can be made thicker by inserting and disposing the secondary plates 30, 40, so that the curvature of the rounded portion 11b of the folded portion 11 increases, thereby preventing the development of a crack. In addition, the compressibility of the folded portion 11 can be increased by the full bead 41 of the second secondary plate 40, thereby preventing creep relaxation of the folded portion 11. Usually, a full bead is used for the bead 41 of the second secondary plate 40. However, a half bead may be used, and any bead can be used as long as the bead can prevent creep relaxation of the folded portion 11. Also, some of beads may be combined.

In addition, as shown in FIG. 4, the plate thickness t2 around the cylinder bore 2 of the second metal plate 20A is made smaller than the half th of the thickness tg of the folded portion 11, i.e. t2<th (=tg/2). Incidentally, the thickness tg of the folded portion 11 becomes thicker by inserting and disposing the secondary plates 30, 40 into the inside of the folded portion 11, so that the plate thickness t2 around the cylinder bore 2 of the second metal plate 20A can easily be made smaller than the half th of the thickness tg of the folded portion 11, respectively.

In addition, the second metal plate 20A includes a half bead 22A around the water hole 3. The direction of the projection of the half bead 22A is the same as that of the projected portion 41a of the full bead 41 of the second secondary plate 40. Also, the third secondary plate 50 forms the half bead 51 which has the opposite direction of the half bead 22A. These two half beads 22A, 51 are disposed in the same position in a plan view. More specifically, each sloping portion of each half bead 22A, 51 is disposed in such a way as to overlap each other in the plan view. Also, the end portion 50a of the third secondary plate 50 which is located on the periphery side of the cylinder bore 2 is positioned on the outer perimeter side compared to the end portion 11a of the folded portion 11.

Therefore, the rounded portion 11b of the folded portion 11 of the first metal plate 10, and the end portion 20Aa of the second metal plate 20A are aligned around the cylinder bore 2. End portions 10b, 20Ab of the first and second metal plates 10, 20A, and end portions 30b, 50b of the first and third secondary plates 30, 50, are aligned around the periphery of the water hole 3.

According to the cylinder head gasket 1A with the above-mentioned structure, even when a large tightening force is generated around the cylinder bore 2 due to the relationship of the thicknesses, the end portion 20Aa of the second metal plate 20A is entered into the rounded portion 11b side of the folded portion 11 around the periphery of the cylinder bore 2. Accordingly, a large surface pressure is not generated around the periphery of the cylinder bore 2, and the maximum surface pressure is generated on the outer perimeter side. As a result, an excessive seal pressure is not added in the periphery of the cylinder bore of the engine, thereby controlling the deformation of the cylinder bore. More specifically, by minimizing the maximum value of the surface pressure on the periphery of each cylinder bore 2, the deformation of each cylinder bore can be prevented. Incidentally, the width of the folded portion 11 or shapes or sizes of the beads 21A, 41 can be obtained by a distribution of the surface pressure which is obtained by an experiment or calculation.

Also, when a large tightening force is not added, an appropriate seal pressure is added even in the periphery of the cylinder bore by the folded portion 11 and the full bead 21A, and moreover, a seal pressure is added by a seal line which is formed by the full bead 21A on the outer perimeter side, thereby exerting an excellent seal quality.

With the first and second secondary plates 30, 40, the thickness tg of the folded portion 11 can be adjusted, and moreover, the compressibility of the folded portion 11 can be increased by the full bead 41 of the second secondary plate 40, thereby preventing creep relaxation of the folded portion 11. Usually, a full bead is used for the bead 41 of the second secondary plate 40. However, a half bead may be used, and any bead may be used as long as the bead can prevent creep relaxation of the folded portion 11. Also, some number of beads may be combined.

Also, if the projected portion 21Aa of the full bead 21A of the second metal plate 20A, and the projected portion (contact portion with the first metal plate) 41a of the full bead 41 of the second secondary plate 40 are located in the same position in a plan view, a larger seal pressure can be generated. Also, if the above-mentioned two projected portions 21Aa, 41a are misaligned in the plan view, the area of a relatively large seal pressure can be broadened while the maximum seal pressure is reduced.

With this structure, even when the upper surface side and the lower surface side of the cylinder head gasket 1 are rubbed against each other and misaligned due to an external factor, such as the heat deformation of the cylinder head or the cylinder block, the rise of the surface pressure on the end portion of the bore can be controlled, thereby reducing the indentation generated at the cylinder head or the cylinder block.

In the above, the full beads 21A, 41 are explained with the circular bead of the cross-sectional shape. However, the shape of the bead is not specially limited in this invention, and the cross-sectional shape may be a circular arc, sine (cosine), trapezoid, triangle (mountain shape), and the like.

Figure 5:
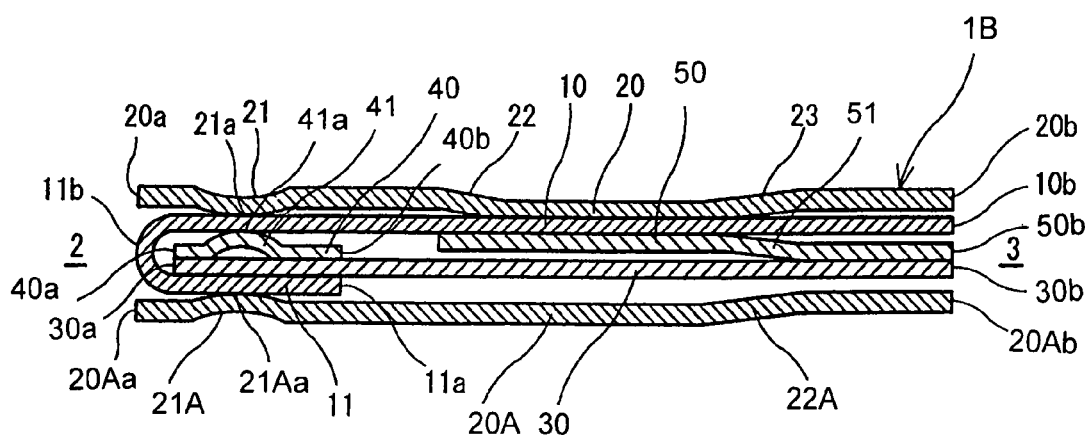
FIG. 5 is a fragmentary sectional view of the cylinder head gasket according to a third embodiment of the present invention.
Figure 6:
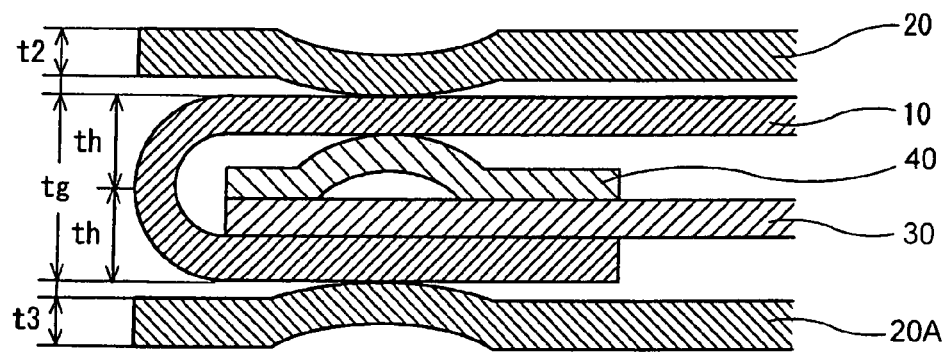
FIG. 6 is an enlarged fragmentary sectional view of the proximity of the folded portion in FIG. 5.

Next, the third embodiment of the invention will be explained. As shown in FIGS. 5 and 6, a cylinder head gasket 1B of the third embodiment is comprised of three sheets of metal plates 10, 20, 20A and three sheets of secondary plates 30, 40, 50. The first metal plate 10 is made of annealed stainless, and the second metal plates 20, 20A are made of stainless spring steel. Also, the first secondary plate 30 is made of soft steel or annealed stainless, and the second secondary plate 40 including the full bead 41 is made of stainless material. In addition, the third secondary plate 50 including the half bead 51 is made of annealed stainless.

The first metal plate 10 includes the folded portion 11 which is made by folding back the first metal plate 10 around the cylinder bore 2. The second and third metal plates 20, 20A are disposed to sandwich the first metal plate 10. Full beads 21, 21Aa which project to the first metal plate 10 side (inside) are provided in the second and third metal plates 20, 20A. Projected portion 21a, 21Aa of the full bead 21, 21A are located on the inner perimeter side of the end portion 11a of the folded portion 11.

Also, the first secondary plate 30 and the second secondary plate 40 are inserted and disposed inside the folded portion 11. The first secondary plate 30 is formed flat on the inner perimeter side of the end portion 11a of the folded portion 11. The second secondary plate 40 is formed in a ring-shaped plate with the full bead 41 on the inner perimeter side of the end portion 11a of the folded portion 11. In a plan view, the end portion 40a on the inner perimeter side of the second secondary plate 40 is located in the same position with the end portion 30a on the inner perimeter side of the first secondary plate 30. The end portion 40b on the outer perimeter side of the second secondary plate 40 is located in the same position with the end portion 11a of the folded portion 11. The thickness tg of the folded portion 11 can be made thicker by inserting and disposing the secondary plates 30, 40, so that the curvature of the rounded portion 11b of the folded portion 11 increases, thereby preventing the development of a crack. In addition, the compressibility of the folded portion 11 can be increased by the full bead 41 of the second secondary plate 40, thereby preventing creep relaxation of the folded portion 11. Usually, a full bead is used for the bead 41 of the second secondary plate 40. However, a half bead may be used, and any bead can be used as long as the bead can prevent creep relaxation of the folded portion 11. Also, some of beads may be combined.

In addition, as shown in FIG. 6, each of the plate thicknesses t2, t3 around the cylinder bore 2 of the second and third metal plates 20A is made smaller than the half th of the thickness tg of the folded portion 11, i.e. t2<th and t3<th (=tg/2). Incidentally, the thickness tg of the folded portion 11 becomes thicker by inserting and disposing the secondary plates 30, 40 into the inside of the folded portion 11, so that each of the plate thicknesses t2, t3 around the cylinder bore 2 of the second and third metal plates 20, 20A can easily be made smaller than the half th of the thickness tg of the folded portion 11, respectively.

In addition, the second metal plate 20 includes half beads 22, 23 around the water hole 3, and the third metal plate 20A includes a half bead 22A around the water hole 3. The directions of the projections of the half bead 23, 22A are the same as the direction of the projected portion 41a of the full bead 41 of the second secondary plate 40. Also, the third secondary plate 50 forms the half bead 51 which has the opposite directions of the half beads 23, 22A. These three half beads 22A, 23, 51 are disposed in the same position in a plan view. More specifically, each sloping portion of each half bead 22A, 23, 51 is disposed in such a way as to overlap each other in the plan view. Also, the end portion of the third secondary plate 50 which is located on the periphery side of the cylinder bore 2 is positioned on the outer perimeter side compared to the end portion 11a of the folded portion 11.

Therefore, the rounded portion 11b of the folded portion 11 of the first metal plate 10, and the end portions 20a, 20Aa of the second and third metal plate 20, 20A are aligned around the cylinder bore 2. End portions 10b, 20b, 20Ab of the first, second and third metal plates 10, 20, 20A, and end portions 30b, 50b of the first and third secondary plates 30, 50, are aligned around the periphery of the water hole 3.

According to the cylinder head gasket 1B with the above-mentioned structure, even when a large tightening force is generated around the cylinder bore 2 due to the relationship of the thicknesses, the end portions 20a, 20Aa of the second and third metal plates 20, 20A are entered into the rounded portion 11b side of the folded portion 11 around the periphery of the cylinder bore 2. Accordingly, a large surface pressure is not generated around the periphery of the cylinder bore 2, and the maximum surface pressure is generated on the outer perimeter side. As a result, an excessive seal pressure is not added in the periphery of the cylinder bore of the engine, thereby controlling the deformation of the cylinder bore. More specifically, by minimizing the maximum value of the surface pressure on the periphery of each cylinder bore 2, the deformation of each cylinder bore can be prevented. Incidentally, the width of the folded portion 11 or shapes or sizes of the beads 21, 21A, 41 can be obtained by a distribution of the surface pressure which is obtained by an experiment or calculation.

Also, when a large tightening force is not added, an appropriate seal pressure is added even in the periphery of the cylinder bore by the folded portion 11 and the full beads 21, 21A, and moreover, a seal pressure is added by a seal line which is formed by the full bead 21, 21A on the outer perimeter side, thereby exerting an excellent seal quality.

With the first and second secondary plates 30, 40, the thickness tg of the folded portion 11 can be adjusted, and moreover, the compressibility of the folded portion 11 can be increased by the full bead 41 of the second secondary plate 40, thereby preventing creep relaxation of the folded portion 11. Usually, a full bead is used for the bead 41 of the second secondary plate 40. However, a half bead may be used, and any bead may be used as long as the bead can prevent creep relaxation of the folded portion 11. Also, some number of beads may be combined.

Also, if the projected portions 21a, 21Aa of the full beads 21, 21A of the second and third metal plates 20, 20A, and the projected portion (contact portion with the first metal plate) 41a of the full bead 41 of the second secondary plate 40 are located in the same position in a plan view, a larger seal pressure can be generated. Also, if the above-mentioned two or three projected portions 21a, 21Aa, 41a are misaligned in the plan view, the area of a relatively large seal pressure can be broadened while the maximum seal pressure is reduced.

With this structure, even when the upper surface side and the lower surface side of the cylinder head gasket 1 are rubbed against each other and misaligned due to an external factor, such as the heat deformation of the cylinder head or the cylinder block, the rise of the surface pressure on the end portion of the bore can be controlled, thereby reducing the indentation generated at the cylinder head or the cylinder block.

In the above, the full beads 21, 21A, 41 are explained with the circular bead of the cross-sectional shape. However, the shape of the bead is not specially limited in this invention, and the cross-sectional shape may be a circular arc, sine (cosine), trapezoid, triangle (mountain shape), and the like.

The disclosures of Japanese Patent Applications No. 2006-136162 filed on May 16, 2006 and No. 2006-296644 filed on Oct. 31, 2006 are incorporated in the application.

While the invention has been explained with reference to the specific embodiments of the invention, the explanation is illustrative and the invention is limited only by the appended claims.

What is claimed is:

1. A cylinder head gasket for an internal combustion engine with a cylinder bore and a fluid hole, comprising:
   a first metal plate having a curved portion around the cylinder bore and a folded portion extending from the curved portion,
   a second metal plate laminated on the first metal plate at a side opposite to a side where the folded portion is formed, said second metal plate having a first full bead projecting toward the first metal plate and disposed above the folded portion, and inner and outer half beads spaced apart from each other and projecting toward the first metal plate laterally outside the folded portion,
   a first secondary plate having a flat inner perimeter portion located in the folded portion,
   a second secondary plate having a ring shape and including a full bead extending toward the second metal plate, said second secondary plate being located in the folded portion above the first secondary plate, and
   a third secondary plate laminated on the first secondary plate laterally outside the second secondary plate and the folded portion, said third secondary plate having a half bead at a position laminated with the outer half bead of the second metal plate,
   wherein the second metal plate has a thickness around the cylinder bore smaller than half of a thickness of the folded portion,
   said second metal plate has an end portion above the curved portion and a space relative to the first metal plate between the first full bead and the end portion so that when the gasket is compressed, the end portion is urged to be curved along a curvature of the curved portion to thereby prevent a large surface pressure generated immediately around a periphery of the cylinder bore and a maximum surface pressure is generated on an outer perimeter side, and
   the first full bead and the full bead of the second secondary plate are vertically aligned.

2. A cylinder head gasket for an internal combustion engine with a cylinder bore and a fluid hole, comprising:
   a first metal plate having a curved portion around the cylinder bore and a folded portion extending from the curved portion,
   a second metal plate laminated under the first metal plate at a side where the folded portion is formed, said second metal plate having a first full bead projecting toward the folded portion, and a half bead projecting toward the first metal plate laterally outside the folded portion,
   a first secondary plate having a flat inner perimeter portion located in the folded portion,
   a second secondary plate having a ring shape and including a full bead extending in a direction away from the second metal plate, said second secondary plate being located in the folded portion above the first secondary plate, and
   a third secondary plate laminated on the first secondary plate laterally outside the folded portion, said third secondary plate having a half bead at a position laminated with the half bead of the second metal plate,
   wherein the second metal plate has a thickness around the cylinder bore smaller than half of a thickness of the folded portion,
   said second metal plate has an end portion below the curved portion and a space relative to the folded portion between the first full bead and the end portion so that when the gasket is compressed, the end portion is urged to be curved along a curvature of the curved portion to thereby prevent a large surface pressure generated immediately around a periphery of the cylinder bore and a maximum surface pressure is generated on an outer perimeter side, and
   the first full bead and the full bead of the second secondary plate are vertically aligned.

3. A cylinder head gasket for an internal combustion engine with a cylinder bore and a fluid hole, comprising:
   a first metal plate having a curved portion around the cylinder bore and a folded portion extending from the curved portion,
   a second metal plate laminated on the first metal plate at a side opposite to a side where the folded portion is formed, said second metal plate having a first full bead projecting toward the first metal plate disposed above the folded portion, and inner and outer half beads spaced apart from each other and projecting toward the first metal plate laterally outside the folded portion,
   a first secondary plate having a flat inner perimeter portion located in the folded portion,
   a second secondary plate having a ring shape and including a full bead extending toward the second metal plate, said second secondary plate being located in the folded portion above the first secondary plate,
   a third secondary plate laminated on the first secondary plate laterally outside the second secondary plate and the folded portion, said third secondary plate having a half bead at a position laminated with the outer half bead of the second metal plate, and
   a third metal plate laminated under the first secondary plate, said third metal plate having a second full bead projecting toward the folded portion symmetrical to the first full bead relative to the first metal plate, and a half bead at a position laminated with the outer half bead of the second metal plate and the half bead of the third secondary plate, wherein each of the second and third metal plates has a thickness around the cylinder bore smaller than half of a thickness of the folded portion, said second metal plate has an end portion above the curved portion and a space relative to the first metal plate between the first full bead and the end portion so that when the gasket is compressed, the end portion is urged to be curved along a curvature of the curved portion, said third metal plate has an end portion below the curved portion and a space relative to the folded portion between the second full bead and the end portion thereof so that when the gasket is compressed, the end portions of the second and third metal plates are urged to be curved along a curvature of the curved portion to thereby prevent a large surface pressure generated immediately around a periphery of the cylinder bore and a maximum surface pressure is generated on an outer perimeter side, and the first and second full beads and the full bead of the second secondary plate are vertically aligned.

* * * * *